United States Patent
Lu et al.

(10) Patent No.: US 11,530,294 B2
(45) Date of Patent: Dec. 20, 2022

(54) POLYLACTIC ACID COMPOSITE AND USE THEREOF

(71) Applicants: Kingfa Sci. & Tech. Co., Ltd., Guangzhou (CN); Zhuhai Wango Chemical Co., Ltd., Zhuhai (CN)

(72) Inventors: Changli Lu, Guangzhou (CN); Zhimin Yuan, Guangzhou (CN); Tongmin Cai, Guangzhou (CN); Xianbo Huang, Guangzhou (CN); Xiangbin Zeng, Guangzhou (CN); Jian Jiao, Guangzhou (CN); Kai Xiong, Guangzhou (CN); Hui Yang, Guangzhou (CN); Kaijin Mai, Guangzhou (CN); Xueteng Dong, Guangzhou (CN); Shihua He, Guangzhou (CN)

(73) Assignees: KINGFA SCI. & TECH. CO., LTD., Guangdong (CN); ZHUHAI WANGO CHEMICAL CO., LTD., Guangdong (CN)

( * ) Notice: Subject to any disclaimer, the term of this patent is extended or adjusted under 35 U.S.C. 154(b) by 13 days.

(21) Appl. No.: 16/644,509

(22) PCT Filed: Jun. 26, 2018

(86) PCT No.: PCT/CN2018/092803
§ 371 (c)(1),
(2) Date: Mar. 5, 2020

(87) PCT Pub. No.: WO2019/100713
PCT Pub. Date: May 31, 2019

(65) Prior Publication Data
US 2020/0291176 A1 Sep. 17, 2020

(30) Foreign Application Priority Data
Nov. 27, 2017 (CN) .......................... 201711204904.6

(51) Int. Cl.
| | | |
|---|---|---|
| C08G 63/08 | (2006.01) | |
| C08K 3/34 | (2006.01) | |
| C08K 5/00 | (2006.01) | |

(52) U.S. Cl.
CPC ............... *C08G 63/08* (2013.01); *C08K 3/34* (2013.01); *C08K 5/0016* (2013.01)

(58) Field of Classification Search
CPC ........ C08G 63/08; C08K 3/34; C08K 5/0016; C08K 5/11; C08K 2201/003; C08L 2201/08; C08L 2201/10; C08L 2205/24; C08L 67/04
See application file for complete search history.

(56) References Cited

U.S. PATENT DOCUMENTS

| | | | | |
|---|---|---|---|---|
| 5,908,918 A | * | 6/1999 | Chen ...................... | C08L 67/04 528/354 |
| 2008/0113887 A1 | * | 5/2008 | Scheer ................... | C08L 67/04 508/136 |
| 2009/0246544 A1 | * | 10/2009 | Narita ...................... | C08J 7/048 428/480 |
| 2020/0283622 A1 | * | 9/2020 | Kim ....................... | C08G 18/48 |

FOREIGN PATENT DOCUMENTS

| | | |
|---|---|---|
| CN | 101157793 | 6/2011 |
| CN | 102086299 | 6/2011 |
| CN | 102268178 | 12/2011 |
| CN | 101602884 | 2/2012 |
| CN | 103965596 | 8/2014 |
| CN | 104530667 | 4/2015 |
| CN | 105073890 | 11/2015 |
| CN | 105153659 | 12/2015 |
| CN | 105623212 | 6/2016 |

(Continued)

OTHER PUBLICATIONS

Li et al.; Polymer, 2007, vol. 48, p. 6855-6866.*

(Continued)

*Primary Examiner* — Robert S Jones, Jr.
(74) *Attorney, Agent, or Firm* — JCIPRNET

(57) ABSTRACT

The present invention discloses a polylactic acid composite and use thereof. The polylactic acid composite includes the following components: (A) 89 to 98 parts by weight of polylactic acid; (B) 1 to 4 parts by weight of talcum powder; and (C) 1 to 7 parts by weight of a plasticizer. In the component (A), the polylactic acid has a polydispersity index P satisfying the following relationship: $1.55 \leq P \leq 2.02$. In the component (B), the talcum powder has a particle size $D_{(50)}$ satisfying: $1\ \mu m \leq D_{(50)} \leq 2.6\ \mu m$. In the component (C), the plasticizer has a relative molecular weight M satisfying: $180 \leq M \leq 670$. Through research, the present invention has unexpectedly discovered that by using the polylactic acid having the polydispersity index P satisfying the relationship $1.55 \leq P \leq 2.02$ as a matrix, adding a specific range of content of ultrafine talcum powder as a nucleating agent, and selecting the plasticizer of a specific molecular weight as a crystallization promotion agent, the prepared polylactic acid composite has a light transmittance $T \geq 80\%$, a haze $H \leq 40\%$, and a heat deflection temperature $HDT \geq 90°$ C., having significantly improved heat resistance and transparency.

10 Claims, No Drawings

(56) References Cited

FOREIGN PATENT DOCUMENTS

| | | |
|---|---|---|
| CN | 106916422 | 7/2017 |
| CN | 108003581 | 5/2018 |
| WO | WO 2019/100713 | 5/2019 |

OTHER PUBLICATIONS

Mysiukiewicz et al.; Polymers, 2020, vol. 12, p. 1-19.*
Imerys; Talc and Chlorite Product Line Sheet, 2013, p. 1-2.*
International Search Report and the Written Opinion dated Aug. 31, 2018 From the International Searching Authority Re. Application No. PCT/CN2018/092803 and Its Translation of Search Report Into English. (11 Pages).

* cited by examiner

POLYLACTIC ACID COMPOSITE AND USE THEREOF

RELATED APPLICATIONS

This application is a National Phase of PCT Patent Application No. PCT/CN2018/092803 having International filing date of Jun. 26, 2018, which claims the benefit of priority of Chinese Patent Application No. 201711204904.6 filed on Nov. 27, 2017. The contents of the above applications are all incorporated by reference as if fully set forth herein in their entirety.

FIELD AND BACKGROUND OF THE INVENTION

The present invention belongs to the technical field of polymer material modification, and in particular, to a polylactic acid composite and use thereof.

Polylactic resin is a polymer material obtained by chemical synthesis or biosynthesis using lactic acid as a monomer. Its raw materials are mainly corn, potatoes, etc., and its price is low. At the same time, as its raw materials are natural crops, carbon emissions are very low. From a safety point of view, polylactic acid is non-toxic and non-irritating, has excellent transparency and biodegradability, and is easily catabolized by a variety of microorganisms in nature or enzymes in plants and animals, eventually forming carbon dioxide and water, and thereby to a certain extent it reduces white pollution and is an ideal green polymer material.

In addition to being biodegradable, products made of polylactic acid have good biocompatibility, glossiness, and transparency, and also have certain bacterial resistance, flame resistance, and UV resistance. Therefore, they have been used in feeding bottles, transparent water cups, etc. However, the thermal deformation temperature of polylactic acid is only 55 to 65° C., which cannot be directly applied to products with high heat resistance requirements, or even meet the general transportation needs. Therefore, when polylactic acid is applied to feeding bottles, transparent water cups, etc., the first thing to be solved is to improve the heat resistance of the material while ensuring the transparency of the material.

Patent CN 105153659 A promotes full cross-linking of reactive groups of each component of polylactic acid, compatibilizer, nucleating agent, and filler material by adding seaweed fiber, which improves the mechanical properties and heat resistance of the material. Patent CN 101157793 B adopts compounding of polylactic acid and polyester with high glass transition temperature, and simultaneously combines isothermal crystallization processing technology to prepare a high heat resistant polylactic acid composite. Patent CN 101602884 B adopts polylactic acid with oligo-D lactic acid content of less than 5 wt% as a matrix component. Under the effect of plant fibers, nucleating agents, inorganic fillers, etc., a high heat resistant polylactic acid composite is obtained through heat treatment. However, the above patents, while increasing the heat-resistance temperature of polylactic acid composite, have greatly reduced the transparency of the material, which has greatly limited its application in the field of baby products such as feeding bottles.

Through research, the present invention has unexpectedly discovered that by using the polylactic acid having a polydispersity index P satisfying a specific relationship as a matrix, adding a specific range of content of ultrafine talcum powder as a nucleating agent, and selecting a plasticizer that is liquid at room temperature as a crystallization promotion agent, the prepared polylactic acid composite has significantly improved heat resistance while maintaining good transparency.

SUMMARY OF THE INVENTION

An objective of the present invention is to provide a polylactic acid composite, which has significantly improved heat resistance while maintaining good transparency.

The present invention is achieved by the following technical solution.

A polylactic acid composite, in parts by weight, includes the following components:

(A) 89 to 98 parts by weight of polylactic acid;
(B) 1 to 4 parts by weight of talcum powder; and
(C) 1 to 7 parts by weight of a plasticizer;

wherein in the component (A), the polylactic acid has a polydispersity index P satisfying the following relationship: $1.55 \leq P \leq 2.02$;

in the component (B), the talcum powder has a particle size $D_{(50)}$ satisfying $1~\mu m \leq D_{(50)} \leq 2.6~\mu m$;

in the component (C), the plasticizer has a relative molecular weight M satisfying: $180 \leq M \leq 670$.

It is well known in the art that polylactic acid is usually synthesized using lactide as a monomer. Due to different synthetic processes, the molecular weight distribution of the obtained polylactic acid varies greatly. Polydispersity index P is an important indicator for measuring the molecular weight distribution width of a polymer. The smaller the P value, the narrower the molecular weight distribution of the polymer; and the larger the P value, the wider the molecular weight distribution of the polymer. Through several tests, the present invention found that, when the polydispersity index P of the polylactic acid is too small, crystallization capability of the polylactic acid is better, and the transparency is lowered; when the polydispersity index P of the polylactic acid is too large, the presence of low-molecular-weight oligomers in the polylactic acid will also cause the transparency of the polylactic acid to decrease. Therefore, the polydispersity index P of the polylactic acid according to the present invention satisfies the following relationship: $1.55 \leq P \leq 2.02$.

The polylactic acid of the present invention can be self-made by known methods, or it can be obtained from commercially available products.

Using talcum powder as a conventional nucleating agent for polylactic acid, theoretically the finer the particle size, the stronger the nucleation ability, but the smaller the particle size, the more likely it is to agglomerate during processing, on one hand it will reduce the nucleation ability, on the other hand it will also affect the transparency of the finished product. In addition, if the amount of talcum powder added exceeds a certain range, the transparency of the finished product will also significantly decrease. Therefore, the talcum powder of the present invention having a particle size $D_{(50)}$ satisfying $1~\mu m \leq D_{(50)} \leq 2.6~\mu m$ is appropriate, and its addition amount accounts for 1 to 4 parts by weight of the entire polylactic acid composite.

The relative molecular weight M of the plasticizer selected by the present invention satisfies: $180 \leq M \leq 670$. The plasticizer is one or a mixture of more of PEG-200, PEG-400, sorbitol, sorbitol monoacetate, sorbitol diacetate, citrate, acetyl citrate (e.g. n-butyl acetyl citrate), and triacetin, preferably one or a mixture of more of PEG-200, PEG-400, acetyl citrate, and triacetin. Adding a plasticizer that is a small molecule compound into polylactic acid can speed up the movement of polylactic acid segments, improve the crystallization performance to a certain extent, and improve the heat resistance of the material; at the same time, the movement of the segments can cause a gap between the molecules to increase to improve transparency of the material.

Through research, the present invention has discovered that by using the polylactic acid having a polydispersity index P satisfying the relationship $1.55 \leq P \leq 2.02$ as a matrix, adding a specific range of content of ultrafine talcum powder as a nucleating agent, and selecting a plasticizer of a specific molecular weight as a crystallization promotion agent, the prepared polylactic acid composite has significantly improved heat resistance while maintaining good transparency.

As a further preferred technical solution, in the component (A), the polydispersity index P of the polylactic acid satisfies the following relationship: $1.65 \leq P \leq 1.95$, and more preferably, the polydispersity index P of the polylactic acid satisfies the following relationship: $1.70 \leq P \leq 1.85$.

The polylactic acid composite according to the present invention, in parts by weight, further includes 0 to 10 parts by weight of flexibilizer. The flexibilizer is one or a mixture of more of aliphatic polyester, aliphatic-aromatic copolyester, ethylene-vinyl acetate copolymer, methyl methacrylate-butadiene-styrene terpolymer, and polyvinyl alcohol.

The aliphatic polyester is one or a mixture of more of polycaprolactone (PCL), poly(butylene succinate) (PBS), and polyhydroxybutyrate (PHB).

The aliphatic-aromatic copolyester is aliphatic-aromatic copolyester of a diacid-diol type.

The polylactic acid composite according to the present invention, in parts by weight, further includes 0 to 5 parts by weight of organic filler or inorganic filler. The organic filler is one or a mixture of more of natural fiber, straw, and starch. The inorganic filler is one or a mixture of more of montmorillonite, kaolin, chalk, calcium carbonate, gypsum, calcium chloride, titanium white, iron oxide, dolomite, silicon dioxide, wollastonite, titanium dioxide, silicate, mica, glass fiber, and mineral fiber. The addition of the inorganic filler can not only improve the mechanical properties of the material, but also act as a nucleating agent, increase the crystallization rate of the polyester composition, and improve the processing conditions of the polylactic acid composite.

According to actual performance needs, the polylactic acid composite according to the present invention, in parts by weight, further includes 0 to 4 parts by weight of other additives as follows: release agent, surfactant, wax, antistatic agent, dye or other plastic additives.

The release agent is: silicone master batch, montan wax, erucylamide or oleamide.

The surfactant is one or a mixture of more of polysorbate, palmitate, and laurate.

The wax is one or a mixture of more of erucylamide, stearamide, behenamide, beeswax, and beeswax ester.

The antistatic agent is a permanent antistatic agent, and specific examples include one or a mixture of more of PELESTAT-230, PELESTAT-6500, and SUNNICO ASA-2500.

The dye is one or a mixture of more of carbon black, black color base, titanium white, zinc sulfide, phthalocyanine blue, and fluorescent orange.

Said other plastic additives can be nucleating agent, antifogging agent, lubricant (e.g. calcium stearate), primary antioxidant, auxiliary antioxidant, etc.

The polylactic acid composite prepared by the present invention has a light transmittance $T \geq 80\%$, a haze $H \leq 40\%$, and a heat deflection temperature $HDT \geq 90°$ C. Preferably, the polylactic acid composite has a light transmittance $T \geq 85\%$, a haze $H \leq 35\%$, and a heat deflection temperature $HDT \geq 98°$ C. More preferably, the polylactic acid composite has a light transmittance $T \geq 88\%$, a haze $H \leq 20\%$, and a heat deflection temperature $HDT \geq 110°$ C.

The polylactic acid composite of the present invention can be prepared by conventional preparation methods, for example, after mixing the components evenly, putting into a twin-screw extruder, extruding and granulating at 160° C.-190° C. to obtain the polylactic acid composite.

The present invention further provides use of the above-mentioned polylactic acid composite in heat-resistant transparent products, such as feeding bottles, transparent water cups, etc.

Compared with the prior art, the present invention has the following beneficial effects:

Through research, the present invention has unexpectedly discovered that by using the polylactic acid having the polydispersity index P satisfying the relationship $1.55 \leq P \leq 2.02$ as a matrix, adding a specific range of content of ultrafine talcum powder as a nucleating agent, and selecting the plasticizer of a specific molecular weight as a crystallization promotion agent, the prepared polylactic acid composite has a light transmittance $T \geq 80\%$, a haze $H \leq 40\%$, and a heat deflection temperature $HDT \geq 90°$ C., having significantly improved heat resistance while maintaining good transparency.

DESCRIPTION OF SPECIFIC EMBODIMENTS OF THE INVENTION

The present invention is further described below through specific implementations. The following embodiments are preferred implementations of the present invention, but the implementations of the present invention are not limited by the following embodiments.

Preparation of Polylactic Acid:

Polylactic Acid A1

20 mol of commercially available L-lactide was taken as a raw material, toluene was used as an organic solution, 0.03 mol of stannous octoate was added as a catalyst, and they were added to a 20 L stainless steel reactor which was depressurized to high vacuum of 0.085 MPa, and was slowly heated to 145° C., stirring was conducted for 1 hour to completely dissolve the lactide. A toluene vapor generated by heating was extracted, the vacuum was maintained at 0.085 MPa, and the reaction was stopped after a thermostatic reaction at 145° C. was conducted for 12 hours. After the pressure in the reactor is normal pressure, ethyl acetate was added to dissolve solids in the reactor to obtain a solution, and then the solution was poured into a container for air dry to obtain a solid, after the solvent ethyl acetate completely evaporated, the solid was put in a vacuum dryer for use.

The polydispersity index P of the prepared polylactic acid was measured by GPC measurement to be 1.76, with two decimal places retained.

Polylactic Acid A2

20 mol of commercially available L-lactide was taken as a raw material, toluene was used as an organic solution, 0.02 mol of stannous octoate was added as a catalyst, and they were added to a 20 L stainless steel reactor which was depressurized to high vacuum of 0.010 MPa, and was slowly heated to 140° C., stirring was conducted for 1 hour to completely dissolve the lactide. A toluene vapor generated by heating was extracted, the vacuum was maintained at 0.150 MPa, and the reaction was stopped after a thermostatic reaction at 130° C. was conducted for 9 hours. After the pressure in the reactor is normal pressure, ethyl acetate was added to dissolve solids in the reactor to obtain a solution, and then the solution was poured into a container for air dry to obtain a solid, after the solvent ethyl acetate completely evaporated, the solid was put in a vacuum dryer for use.

The polydispersity index P of the prepared polylactic acid was measured by GPC measurement to be 1.94, with two decimal places retained.

Polylactic Acid A3

20 mol of commercially available L-lactide was taken as a raw material, toluene was used as an organic solution, 0.015 mol of stannous octoate was added as a catalyst, and they were added to a 20L stainless steel reactor which was depressurized to high vacuum of 0.150 MPa, and was slowly heated to 130° C., stirring was conducted for 1 hour to completely dissolve the lactide. A toluene vapor generated by heating was extracted, the vacuum was maintained at 0.150 MPa, and the reaction was stopped after a thermostatic reaction at 130° C. was conducted for 8 hours. After the pressure in the reactor is normal pressure, ethyl acetate was added to dissolve solids in the reactor to obtain a solution, and then the solution was poured into a container for air dry to obtain a solid, after the solvent ethyl acetate completely evaporated, the solid was put in a vacuum dryer for use.

The polydispersity index P of the prepared polylactic acid was measured by GPC measurement to be 1.97, with two decimal places retained.

Polylactic Acid B1

20 mol of commercially available L-lactide was taken as a raw material, toluene was used as an organic solution, 0.035 mol of stannous octoate was added as a catalyst, and they were added to a 20 L stainless steel reactor which was depressurized to high vacuum of 0.065 MPa, and was slowly heated to 145° C., stirring was conducted for 1 hour to completely dissolve the lactide. A toluene vapor generated by heating was extracted, the vacuum was maintained at 0.065 MPa, and the reaction was stopped after a thermostatic reaction at 145° C. was conducted for 15 hours. After the pressure in the reactor is normal pressure, ethyl acetate was added to dissolve solids in the reactor to obtain a solution, and then the solution was poured into a container for air dry to obtain a solid, after the solvent ethyl acetate completely evaporated, the solid was put in a vacuum dryer for use.

The polydispersity index P of the prepared polylactic acid was measured by GPC measurement to be 1.50, with two decimal places retained.

Polylactic Acid B2

20 mol of commercially available L-lactide was taken as a raw material, toluene was used as an organic solution, 0.01 mol of stannous octoate was added as a catalyst, and they were added to a 20 L stainless steel reactor which was depressurized to high vacuum of 0.50 MPa, and was slowly heated to 120° C., stirring was conducted for 1 hour to completely dissolve the lactide. A toluene vapor generated by heating was extracted, the vacuum was maintained at 0.50 MPa, and the reaction was stopped after a thermostatic reaction at 120° C. was conducted for 5 hours. After the pressure in the reactor is normal pressure, ethyl acetate was added to dissolve solids in the reactor to obtain a solution, and then the solution -was poured into a container for air dry to obtain a solid, after the solvent ethyl acetate completely evaporated, the solid was put in a vacuum dryer for use.

The polydispersity index P of the prepared polylactic acid was measured by GPC measurement to be 2.12, with two decimal places retained.

Talcum powder:

Plustalc H10 $D_{(50)}$=2.2 μm, MONDO MINERALS B.V;
TYT-8875B $D_{(50)}$=7~9 μm, Haicheng Tianyuan Chemical Co., Ltd.;
self-made talcum powder $D_{(50)}$<1 μm obtained by crushing and sieving talcum powder Plustalc H10 by a pulverizer.

Plasticizer:

ATBC n-butyl acetyl citrate M=402, Wuxi Kailai Biotechnology Co., Ltd.;
PEG 400 M=360~440, Jiangsu Haian Petroleum Chemical Factory;
PEG 800 M=720~880, Jiangsu Haian Petroleum Chemical Factory.

Performance Test Method:

1. Test methods for light transmittance and haze of polylactic acid composite, refer to GBT 2410-2008 "Test Methods for Light Transmittance and Haze of Transparent Plastics".

2. Test method for heat deflection temperature (HDT) of polylactic acid composite, refers to ASTM D648, and the test conditions are 0.45 MPa, 6.4 mm, and side placement.

Preparation of HDT test splines: injection temperature at 170 to 230° C., mold temperature at 90 to 120° C., cooling time of 60 to 90 seconds, injection molding was performed to prepare the splines required for testing HDT according to ASTM D648.

3. The measurement method for polydispersity index P of polylactic acid is as follows:

15 mg of polylactic acid was dissolved in 10 ml of tetrahydrofuran (THF), and 125 μl of this solution was analyzed by gel permeation chromatography (GPC). Measurement was conducted at room temperature, and pure tetrahydrofuran was used as a mobile phase for elution, and an elution rate is 1 ml/min. Polystyrene standards of various molecular weights were used to calibrate the curve, and an elution range outside the curve was determined by extrapolation.

4. The test method for particle size of talcum powder is carried out by referring to the method of GB/T 19077.1 "Particle Size Analysis Laser Diffraction Method".

Embodiments 1-8 and comparative examples 1-6:

According to the formula of Table 1, polylactic acid, talcum powder and plasticizer were mixed uniformly, put into a twin-screw extruder, and then extruded and pelletized at 160° C. to 190° C. to obtain polylactic acid composite.

TABLE 1

| | Ratio and performance test results of polylactic acid composite (parts by weight) | | | | | | | | | | | | | |
|---|---|---|---|---|---|---|---|---|---|---|---|---|---|
| | Compa. ex. 1 | Compa. ex. 2 | Compa. ex. 3 | Compa. ex. 4 | Compa. ex. 5 | Compa. ex. 6 | embodiment 1 | embodiment 2 | embodiment 3 | embodiment 4 | embodiment 5 | embodiment 6 | embodiment 7 | embodiment 8 |
| polylactic acid A1 | | | 93 | 93 | 93 | 93 | | | | 95 | 89 | 90 | 95 | 93 |
| polylactic acid A2 | | | | | | | | 93 | | | | | | |

TABLE 1-continued

Ratio and performance test results of polylactic acid composite (parts by weight)

| | Compa. ex. 1 | Compa. ex. 2 | Compa. ex. 3 | Compa. ex. 4 | Compa. ex. 5 | Compa. ex. 6 | embodiment 1 | embodiment 2 | embodiment 3 | embodiment 4 | embodiment 5 | embodiment 6 | embodiment 7 | embodiment 8 |
|---|---|---|---|---|---|---|---|---|---|---|---|---|---|---|
| polylactic acid A3 | | | | | | | | | 93 | | | | | |
| polylactic acid B1 | 93 | | | | | | | | | | | | | |
| polylactic acid B2 | | 93 | | | | | | | | | | | | |
| Plustalc H10 | 2 | 2 | | | 10 | 2 | 2 | 2 | 4 | 4 | 3 | 2 | 4 | |
| self-made talcum powder | | | 2 | | | | | | | | | | | |
| TYT-8875B | | | | 2 | | | | | | | | | | |
| ATBC | | | | | | | | | | 1 | 6 | 5 | 3 | 3 |
| PEG 400 | 5 | 5 | 5 | 5 | | 5 | 5 | 5 | 5 | | | | | |
| PEG 800 | | | | | 5 | | | | | | | | | |
| light transmittance T % | 76.4 | 70.5 | 67.0 | 68.4 | 66.4 | 48.2 | 88.5 | 86.7 | 85.1 | 84.1 | 80.8 | 82.9 | 89.7 | 86.6 |
| haze H % | 45.82 | 51.75 | 55.35 | 48.33 | 56.93 | 67.5 | 12.92 | 20.85 | 22.34 | 19.38 | 23.45 | 22.01 | 11.54 | 17.56 |
| HDT ° C. | 78 | 112 | 96 | 117 | 101 | 109 | 110 | 101 | 92 | 105 | 107 | 101 | 116 | 110 |

From the results in Table 1, it can be seen that in the embodiments of the present invention, by using the polylactic acid having a polydispersity index P satisfying the relationship 1.55≤P≤2.02 as a matrix, adding a specific range of content of ultrafine talcum powder having a particle size $D_{(50)}$ satisfying 1 μm≤$D_{(50)}$<2.6 μm as a nucleating agent, and selecting a plasticizer of a specific molecular weight as a crystallization promotion agent, the prepared polylactic acid composite has a light transmittance T≥80%, a haze H≤40%, and a heat deflection temperature HDT≥90° C. The polylactic acid composite has significantly improved heat resistance while maintaining good transparency. In the comparative examples 2 to 6, although the heat deflection temperature of the composites has increased, their transparency has severely decreased.

What is claimed is:

1. A polylactic acid composite, comprising:
(A) 89 to 98 parts by weight of polylactic acid;
(B) 1-4 parts by weight of talcum powder; and
(C) 1-7 parts by weight of a plasticizer;
wherein in the component (A), a polydispersity index P of the polylactic acid satisfies the following relationship: 1.94≤P≤1.97, and the polylactic acid is synthesized using only lactide as a monomer;
in the component (B), a particle size D(50) of the talcum powder satisfies: 1μm≤D(50)≤2.6μm;
in the component (C), a relative molecular weight M of he plasticizer satisfies: 180≤M≤670,
wherein the plasticizer is one or a mixture of PEG-200, PEG-400, and triacetin.

2. The polylactic acid composite according to claim 1, wherein in parts by weight, the polylactic acid composite further comprises 0 to 10 parts by weight of a flexibilizer, and the flexibilizer is one or a mixture of aliphatic polyester, aliphatic-aromatic copolyester, ethylene-vinyl acetate copolymer, methyl methacrylate-butadiene-styrene terpolymer, and polyvinyl alcohol.

3. The polylactic acid composite according to claim 2, wherein the aliphatic polyester is one or a mixture of polycaprolactone (PCL), poly(butylene succinate) (PBS), and polyhydroxybutyrate (PHB); and the aliphatic-aromatic copolyester is an aliphatic-aromatic copolyester of a diacid-diol type.

4. The polylactic acid composite according to claim 1, wherein in parts by weight, the polylactic acid composite further comprises 0 to 5 parts by weight of an organic filler or an inorganic filler, the organic filler is one or a mixture of natural fiber, straw, and starch; and the inorganic filler is one or a mixture of montmorillonite, kaolin, chalk, calcium carbonate, gypsum, calcium chloride, titanium white, iron oxide, dolomite, silicon dioxide, wollastonite, titanium dioxide, silicate, mica, glass fiber, and mineral fiber.

5. The polylactic acid composite according to claim 1, wherein in parts by weight, the polylactic acid composite further comprises 0 to 4 parts by weight of other additives as follows: release agent, surfactant, wax, antistatic agent, dye or other plastic additives.

6. The polylactic acid composite according to claim 1, wherein the polylactic acid composite has a light transmittance T≥80%, a haze H≤40%, and HDT≥90° C.

7. A heat-resistant transparent product comprising the polylactic acid composite according to claim 1.

8. A heat-resistant transparent product comprising the polylactic acid composite according to claim 2.

9. A heat-resistant transparent product comprising the polylactic acid composite according to claim 3.

10. A heat-resistant transparent product comprising the polylactic acid composite according to claim 4.

* * * * *